United States Patent
Chowdhury et al.

(10) Patent No.: US 10,572,634 B2
(45) Date of Patent: Feb. 25, 2020

(54) PROVISION OF SECURE CONTENT TO A DISPLAY RECEIVER DEVICE WITHOUT TRANSCRIPTION

(71) Applicant: Intel Corporation, Santa Clara, CA (US)

(72) Inventors: Rajneesh Chowdhury, Portland, OR (US); Karthik Veeramani, Hillsboro, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 15/640,025

(22) Filed: Jun. 30, 2017

(65) Prior Publication Data
US 2019/0005208 A1   Jan. 3, 2019

(51) Int. Cl.
| | |
|---|---|
| H04L 29/06 | (2006.01) |
| G06F 21/12 | (2013.01) |
| G06F 21/60 | (2013.01) |
| H04W 12/08 | (2009.01) |
| H04N 21/254 | (2011.01) |
| H04N 21/4627 | (2011.01) |
| H04L 29/08 | (2006.01) |
| G06F 21/10 | (2013.01) |
| H04N 21/41 | (2011.01) |
| H04N 21/4363 | (2011.01) |
| H04N 21/6437 | (2011.01) |

(52) U.S. Cl.
CPC ............ *G06F 21/121* (2013.01); *G06F 21/10* (2013.01); *G06F 21/602* (2013.01); *H04L 63/107* (2013.01); *H04L 65/4084* (2013.01); *H04L 65/608* (2013.01); *H04L 67/104* (2013.01); *H04N 21/2541* (2013.01); *H04N 21/4122* (2013.01); *H04N 21/43637* (2013.01); *H04N 21/4627* (2013.01); *H04W 12/08* (2013.01); *H04N 21/6437* (2013.01)

(58) Field of Classification Search
CPC .. G06F 21/121; H04L 63/107; H04N 21/2541
USPC .......................................................... 726/29
See application file for complete search history.

(56) References Cited

U.S. PATENT DOCUMENTS

| | | | |
|---|---|---|---|
| 2014/0380046 A1* | 12/2014 | Poornachandran | G06F 21/10 713/167 |
| 2015/0074818 A1* | 3/2015 | Watson | H04N 21/4405 726/27 |

FOREIGN PATENT DOCUMENTS

WO   WO2014209266 A1   12/2015

* cited by examiner

*Primary Examiner* — Evans Desrosiers
(74) *Attorney, Agent, or Firm* — Schwabe, Williamson & Wyatt, P.C.

(57) ABSTRACT

Embodiments include apparatuses, methods, and systems including a wireless display system to provide digital right management secure content to a display receiver device. The display transmitter device may determine to provide a decryption and presentation license for the display receiver device based on the DRM credential and the DRM scheme of the display receiver device. The display transmitter device may further pass through the secure DRM content to the display receiver device based on provision of the decryption and presentation license, wherein the secure DRM content is passed through the display transmitter device without transcription by the display transmitter device. Other embodiments may also be described and claimed.

25 Claims, 6 Drawing Sheets

PROVISION OF SECURE CONTENT TO A DISPLAY RECEIVER DEVICE WITHOUT TRANSCRIPTION

FIELD

Embodiments of the present invention relate generally to the technical field of computing, and more particularly to wireless display systems.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A wireless display system may enable a display transmitter device to provide display content, via a wireless display protocol, to a display receiver device. Sometimes the display content may be clear content without any encryption. Additionally and alternatively, the display content may be secure or protected, which may be encrypted using Digital Rights Management (DRM) software or systems to create secure DRM content. For example, secure DRM content may be streamed by a display transmitter device from a content server of a content provider, such as Netflix™, Hulu™, Google PlayMovies™, etc. In the streaming process, the display transmitter device may decrypt the secure DRM content to obtain clear DRM content based on a protocol between the display transmitter device and the content server. Afterwards, the display transmitter device may encrypt the clear DRM content to be transmitted to a display receiver device based on another protocol between the display transmitter device and the display receiver device. The operations performed by the display transmitter device, e.g., to decrypt the secure DRM content from the content server to obtain clear DRM content, and then to encrypt the clear DRM content to be transmitted to the display receiver device, may be referred to as transcription. Transcription performed by a display transmitter device may be costly and power consuming, which may be a deterrent for a user having a battery powered mobile device as a display transmitter device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
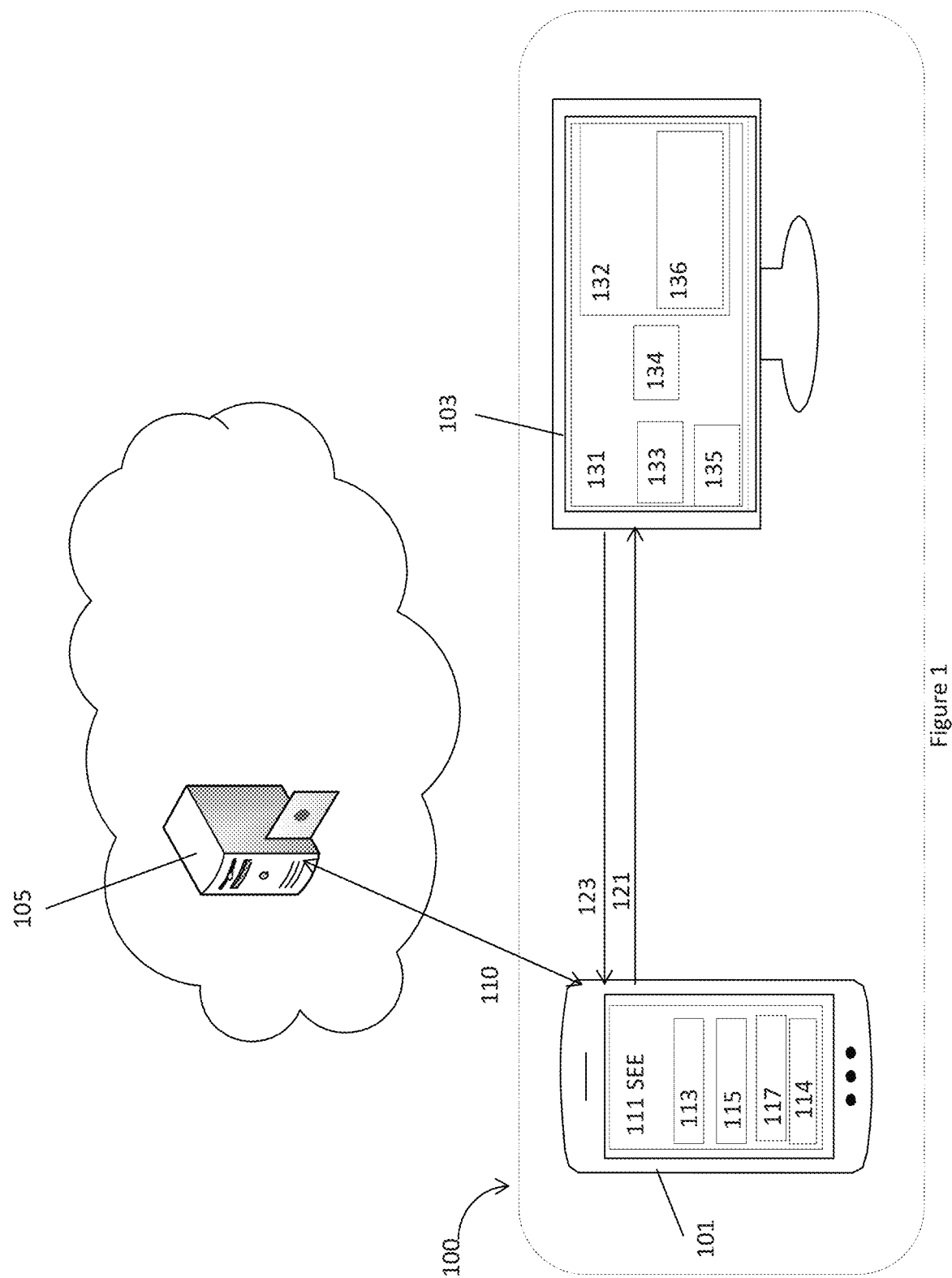
FIG. 1 illustrates an example wireless display system including a display receiver device to receive secure DRM content from a display transmitter device with or without transcription, in accordance with various embodiments.

A wireless display system may enable a display transmitter device to provide display content to a display receiver device. The display content may be secure Digital Rights Management (DRM) content encrypted by DRM software or systems. In embodiments, when secure DRM content is supported by DRM scheme of a display receiver device and the display receiver device may be provided with a decryption and presentation license, the display receiver device may receive the secure DRM content from a display transmitter device without transcription by the display transmitter device. Otherwise, when the secure DRM content is not supported by the DRM scheme of the display receiver device or the display receiver device may not be provided with a decryption and presentation license, the display transmitter device may decrypt the secure DRM content and render the secure DRM content for the display receiver device.

In embodiments, a display transmitter device may be used for provision of display content to a display receiver device. The display transmitter device may include one or more processors, and a secure execution environment to operate on the one or more processors. The secure execution environment may receive, via a wireless display protocol, a DRM scheme supported by the display receiver device, where the DRM scheme includes a DRM credential of the display receiver device. The secure execution environment may determine to provide a decryption and presentation license for the display receiver device based on the DRM credential of the display receiver device, where the decryption and presentation license is for decryption and presentation of secure DRM content, and the secure DRM content is supported by the DRM scheme of the display receiver device. The secure execution environment may provide the decryption and presentation license based on a result of the determination. Furthermore, the secure execution environment may pass through the secure DRM content to the display receiver device based on provision of the decryption and presentation license. The secure DRM content may pass through the display transmitter device without transcription by the display transmitter device.

In embodiments, a display receiver device may be used for wireless provision of display content from a display transmitter device. The display receiver device may include one or more processors and a secure execution environment to operate on the one or more processors. The secure execution environment may transmit, via a wireless display protocol, to the display transmitter device, a DRM scheme supported by the display receiver device, where the DRM scheme includes a DRM credential of the display receiver device. The secure execution environment may receive, from the display transmitter device, a decryption and presentation license for the display receiver device based on the DRM credential of the display receiver device, where the decryption and presentation license may be used for decryption and presentation of secure DRM content. The secure execution environment may receive, from the display transmitter device, the secure DRM content, where the secure DRM content may be passed through the display transmitter device without transcription by the display transmitter device.

In embodiments, a wireless display system may include a display transmitter device and a display receiver device. The display receiver device may communicate to the display transmitter device, via a wireless display protocol, a DRM scheme supported by the display receiver device, where the DRM scheme includes a DRM credential of the display receiver device. The display receiver device may receive, from the display transmitter device, a decryption and presentation license for the display receiver device based on the DRM credential of the display receiver device. The display receiver device may receive, from the display transmitter device, the secure DRM content. The display transmitter device may determine to provide the decryption and presentation license for the display receiver device based on the DRM credential of the display receiver device and the DRM scheme of the display receiver device. Based on a result of the determination, the display transmitter device may provide, to the display receiver device, the decryption and presentation license for the display receiver device. Furthermore, the display transmitter device may pass through the secure DRM content to the display receiver device, where the secure DRM content is passed through without transcription by the display transmitter device.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

FIG. 1 illustrates an example wireless display system 100 including a display receiver device 103 to receive secure DRM content from a display transmitter device 101 with or without transcription, in accordance with various embodiments. For clarity, features of the wireless display system 100 may be described below as an example for understanding an example wireless display system that may include a display receiver device and a display transmitter device. It is to be understood that there may be more or fewer components included in the wireless display system 100. Further, it is to be understood that one or more of the devices and components within the wireless display system 100 may include additional and/or varying features from the description below, and may include any device that one having ordinary skill in the art would consider and/or refer to as the devices and components of a wireless display system.

In embodiments, the wireless display system 100 may include the display transmitter device 101 and the display receiver device 103. The display transmitter device 101 may communicate with a license server 105 through a channel 110 via a protocol. The display transmitter device 101 may communicate with the display receiver device 103 through a forward channel 121 from the display transmitter device 101 to the display receiver device 103, and a backward channel 123 from the display receiver device 103 to the display transmitter device 101, via a wireless display protocol. The wireless display protocol for the forward channel 121 and the backward channel 123 may be different from the protocol for the channel 110 between the display transmitter device 101 and the license server 105.

In embodiments, the display transmitter device 101 may include a secure execution environment 111. The secure execution environment 111 may further include secure DRM content 113 (downloaded from a content server (not shown) or locally generated), a decryption and presentation license 115, a content download license 117, and optionally clear DRM content 114. The display receiver device 103 may include a secure execution environment 131. The secure execution environment 131 may further include secure DRM content 133 (its copy of secure DRM content 113 received from display transmitter device 101), clear DRM content 134, and a decryption and presentation license 135. Furthermore, the secure execution environment 131 may include a DRM scheme 132, which may include a DRM credential 136.

In embodiments, the display transmitter device 101 may be a computer or a computing device that offers information resources, services, and applications to the display receiver device 103. For example, the display transmitter device 101 may be a wearable device, a smartphone, a computer tablet, a laptop, a game controller, a set-top box, an infotainment console, an Internet of Things (IoT) device, or others.

In embodiments, the display receiver device 103 may include a display, which may be a selected one of a light-emitting diode (LED) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

In embodiments, the display transmitter device 101 may include the secure execution environment 111, while the display receiver device 103 may include the secure execution environment 131. The secure execution environment 111 and the secure execution environment 131 may be implemented in hardware or software. An example of hardware implementation of the secure execution environment 111 and the secure execution environment 131 may include hardware circuits, and may include, but is not limited to the Management Engine technology of Intel™ Corporation. An example of software implementation of the secure execution environment 111 and the secure execution environment 131 may include, but is not limited to the Execution Enclave technology of Intel™ Corporation. In addition, the display transmitter device 101 and the display receiver device 103 may include hardware components, e.g., one or more processors, so that the secure execution environment 111 and the secure execution environment 131 may be operated by the one or more processors. Furthermore, the display transmitter device 101 and the display receiver device 103 may include operating systems, and applications, not shown.

For the display transmitter device 101, the secure execution environment 111 may include the secure DRM content 113 and the decryption and presentation license 115, both of which may be transferred to the display receiver device 103 to become the secure DRM content 133 and the decryption and presentation license 135 within the secure execution environment 131. In addition, the secure execution environment 111 may include the content download license 117, which may be used to obtain the secure DRM content 113 from a content server. Furthermore, the secure execution environment 111 may optionally include the clear DRM content 114, which may be obtained by decrypting the secure DRM content 113. The display transmitter device 101 may decrypt the secure DRM content 113 to obtain the clear DRM content 114 when the secure DRM content 113 may not be supported by the DRM scheme 132 of the display receiver device 103.

For the display receiver device 103, the secure execution environment 131 may include the secure DRM content 133 and the decryption and presentation license 135 (if device 103 supports decryption of the secure DRM content 133), both of which may be received from the display transmitter device 101. The secure execution environment 131 may include the clear DRM content 134, which may be obtained by decrypting the secure DRM content 133 based on the decryption and presentation license 135 (if device 103 supports decryption of the secure DRM content 133). In addition, the secure execution environment 131 may include the DRM scheme 132, which may include the DRM credential 136.

In embodiments, the DRM scheme 132 may include the DRM credential 136, and other parameters, e.g., video and audio codec capabilities of the display receiver device 103. For example, the DRM scheme 132 may include a capability of the display receiver device 103 for 4 k premium video streaming, or 1080 p capable. The DRM credential 136 may include information about the identification of the display receiver device 103, or other security information about the display receiver device 103.

In embodiments, the secure DRM content 113 and the secure DRM content 133 may include music, movie, photo, video content, or other content protected by security mechanism. For example, the secure DRM content 113 and the secure DRM content 133 may be content encrypted by a DRM software or system. A DRM software may include any secure software or algorithm applied to encrypt a content to obtain secure DRM content, e.g., Widevine™ DRM content. The secure DRM content 113 may be downloaded from a content server or generated locally by the display transmitter device 101. If the secure DRM content 113 may be downloaded from a content server, the display transmitter device 101 may acquire, from a license server, the content download license 117. Alternatively, the secure DRM content 113 may be generated and encrypted locally by the display transmitter device 101. When the secure DRM content 113 and the secure DRM content 133 may be supported by the DRM scheme 132 of the display receiver device 103, the display transmitter device 101 may not perform decryption or transcription on the secure DRM content 113 to obtain clear DRM content 114. Instead, the transmitter device 101 may pass through the secure DRM content 113 to the display receiver device 103 to become the secure DRM content 133. On the other hand, when the secure DRM content 113 may not be supported by the DRM scheme 132 of the display receiver device 103, the display transmitter device 101 may decrypt the secure DRM content 113 to obtain the clear DRM content 114 for the display receiver device.

In embodiments, the decryption and presentation license 115 may be transferred to the display receiver device 103 to become the decryption and presentation license 135. The decryption and presentation license 135 may be used for decryption and presentation of the secure DRM content 133 by the display receiver device 103. The decryption and presentation license 115 and the decryption and presentation license 135 may be for the display receiver device 103 and may be granted based on the DRM credential 136 of the display receiver device 103. The decryption and presentation license 115 may be granted by the license server 105. In some embodiments, the display transmitter device 101 may act as a license server and may generate the decryption and presentation license 115 locally. When the decryption and presentation license 115 may be granted locally by the display transmitter device 101, the display transmitter device 101 and the display receiver device 103 may negotiate the decryption and presentation license 115 via the wireless protocol on the channel 121 and the channel 123.

In embodiments, the decryption and presentation license 115 and the decryption and presentation license 135 may be valid for a predetermined time period and it may automatically expire by the predetermined time period. Similarly, the decryption and presentation license 115 and the decryption and presentation license 135 may be valid for a predetermined area with a certain radius between the display transmitter device 101 to the display receiver device 103, and it may automatically expire when the distance between the display transmitter device 101 to the display receiver device 103 may be over the predetermined area. Additionally or alternatively, the decryption and presentation license 115 and the decryption and presentation license 135 may be invalidated by the display transmitter device 101 or the secure execution environment 111. In embodiments, the display transmitter device 101 or the secure execution environment 111 may invalidate the decryption and presentation license 115 based on a security policy, where the security policy may be determined based on a proximity of the display receiver device and the display transmitter device, a time duration for the decryption and presentation license, a way the display receiver device renders the secure DRM content, or a revocation list. A revocation list may include an identification of the display receiver device 103 that may not deliver any secure DRM content.

In embodiments, the display transmitter device 101 may communicate with the display receiver device 103 using a client-server model of computing, where the display transmitter device 101 may be a server. In some other embodiments, the display transmitter device 101 and the display receiver device 103 may communicate using peer-to-peer (P2P) model, when the display transmitter device 101 and the display receiver device 101 share and consume resources in an equipotent manner. In embodiments, the display transmitter device 101 may be a master device communicating with the display receiver device 103, where the display receiver device 103 may be a slave device.

In embodiments, the forward channel 121 from the display transmitter device 101 to the display receiver device 103, or the back channel 123 from the display receiver device 103 to the display transmitter device 101, may be wireless channels based on wireless display protocols. In some other embodiments, the forward channel 121 or the back channel 123 may include a wired cable.

In embodiments, the forward channel 121 or the back channel 123 may be based on some communication or computing protocols, e.g., wireless display protocols. The protocols for the forward channel 121 and the back channel 123 may include a protocol stack containing protocols in various layers, e.g., protocols for a physical layer, a medium access layer, a network layer, and/or an application layer. For example, the protocols for the forward channel 121 and the back channel 123 may be a wireless display protocol designed for communication between the display transmitter device 101 and the display receiver device 103. In embodiments, the wireless display protocols may be a selected one of a mobile industry processor interface display serial interface (MIPI-DSI) protocol, a Miracast protocol, or a wireless display (WiDi) protocol. In some embodiments, when wired cables are used as some of the forward channel 121 and the back channel 123, other wired display protocols, e.g., a high-definition multimedia interface (HDMI) protocol, or a display port (DP) protocol, may be used as well. Existing wireless display protocols, e.g., Miracast, may not possess all the features disclosed herein, and may be augmented to include more proposed features disclosed herein. Miracast may be used as an example to demonstrate certain features disclosed in the embodiments. However, the features disclosed may be applicable to any other wireless display protocols.

Miracast is a protocol or a standard for wireless connections, including both the forward channel and the back channel, between display transmitter devices, such as laptops, tablets, or smartphones, and display receiver devices, such as TVs, monitors, or projectors in a wireless display system. Devices that are Miracast-certified may communicate with each other, regardless of manufacturer. Miracast employs a peer-to-peer Wi-Fi direct standard, and may allow sending up to 1080 p high-definition (HD) video (H.264 codec) and 5.1 surround sound. IPv4 may be used on the Internet layer, and transmission control protocol (TCP) or user datagram protocol (UDP) may be used for the transport layer. On the application layer, the communication between a display transmitter device and a display receiver device may be initiated and controlled via real time streaming protocol (RTSP) or real-time transport protocol (RTP). In more detail, the RTSP protocol is an application layer protocol designed for use in entertainment and communications systems to control a streaming media server, e.g., a display transmitter device. The RTSP protocol may be used for establishing and controlling media sessions between end points, e.g., a display transmitter device and a display receiver device.

When a display transmitter device and a display receiver device communicate according to Miracast standard, the display transmitter device and the display receiver device may perform device discovery to discover each other prior to connection setup. Afterwards, the display transmitter device and the display receiver device may select a protocol, e.g., Wi-Fi direct or tunneled direct link setup (TDLS), to setup a connection between them. Upon the establishment of connectivity between the display transmitter device and the display receiver device, the display transmitter device may initiate a TCP connection, with a control port using RTSP to create and manage the sessions between the display transmitter device and the display receiver device. Furthermore, the display transmitter device and the display receiver device may negotiate and determine the parameters for the Miracast session.

Normally, Miracast standard may operate without the secure execution environment 131 and the secure execution environment 111. Without the secure execution environment 131 and the secure execution environment 111, Miracast R2 may support a pass-through mode that allows the display transmitter device 101 to skip transcription for clear unprotected content. For secure DRM content, under normal Miracast standard, the display transmitter device 101 may perform transcription operations. With the secure execution environment 131 and the secure execution environment 111, embodiments disclosed herein may support passing through the secure DRM content to the display receiver device 103, where the secure DRM content is passed through the display transmitter device 101 without transcription by the display transmitter device 101. The secure execution environment 111 may transfer the decryption and presentation license 115 to the display receiver device 103 to become the decryption and presentation license 135 for decrypting the secure DRM content using the decryption and presentation license 135 to obtain clear DRM content 134.

In some embodiments, when Miracast is used as the wireless display protocol for the forward channel 121 and the backward channel 123, Miracast may allow sending up to 1080 p high-definition (HD) video (H.264 codec). Sometimes, the display transmitter device 101 may be capable of decoding up to 1080 p resolution secure DRM content, while the display receiver device 103 may be capable of decoding up to 4 k resolution secure DRM content. The license server 105 may issue the decryption and presentation license 115 according to the 4 k resolution secure DRM content since the secure DRM content may be consumed on the display receiver device 103 as opposed to the display transmitter device 101. The license server 105 may issue the decryption and presentation license 115 to allow 4 k resolution secure DRM content to be streamed from a content server by the display transmitter device 101 to the display receiver device 103, even when the display transmitter device 101 may only support up to 1080 p resolution secure DRM content. The display transmitter device 101 may simply stream the secure DRM content from a content server, e.g., a Netflix server, package the traffic of the secure DRM content as-is in the original frames and pass through the secure DRM content to the display receiver device 103, without transcription by the display transmitter device 101. The display receiver device 103 may use the decryption and presentation license 135 to decrypt the secure DRM content 133 to obtain the clear DRM content 134, and render the clear DRM content 134. Accordingly, the display transmitter device 101 may save power since it does not perform transcription operations. At the meantime, the display receiver device 103 may be able to render a higher quality DRM contents, compared to the capabilities of the display transmitter device 101.

Figure 2:
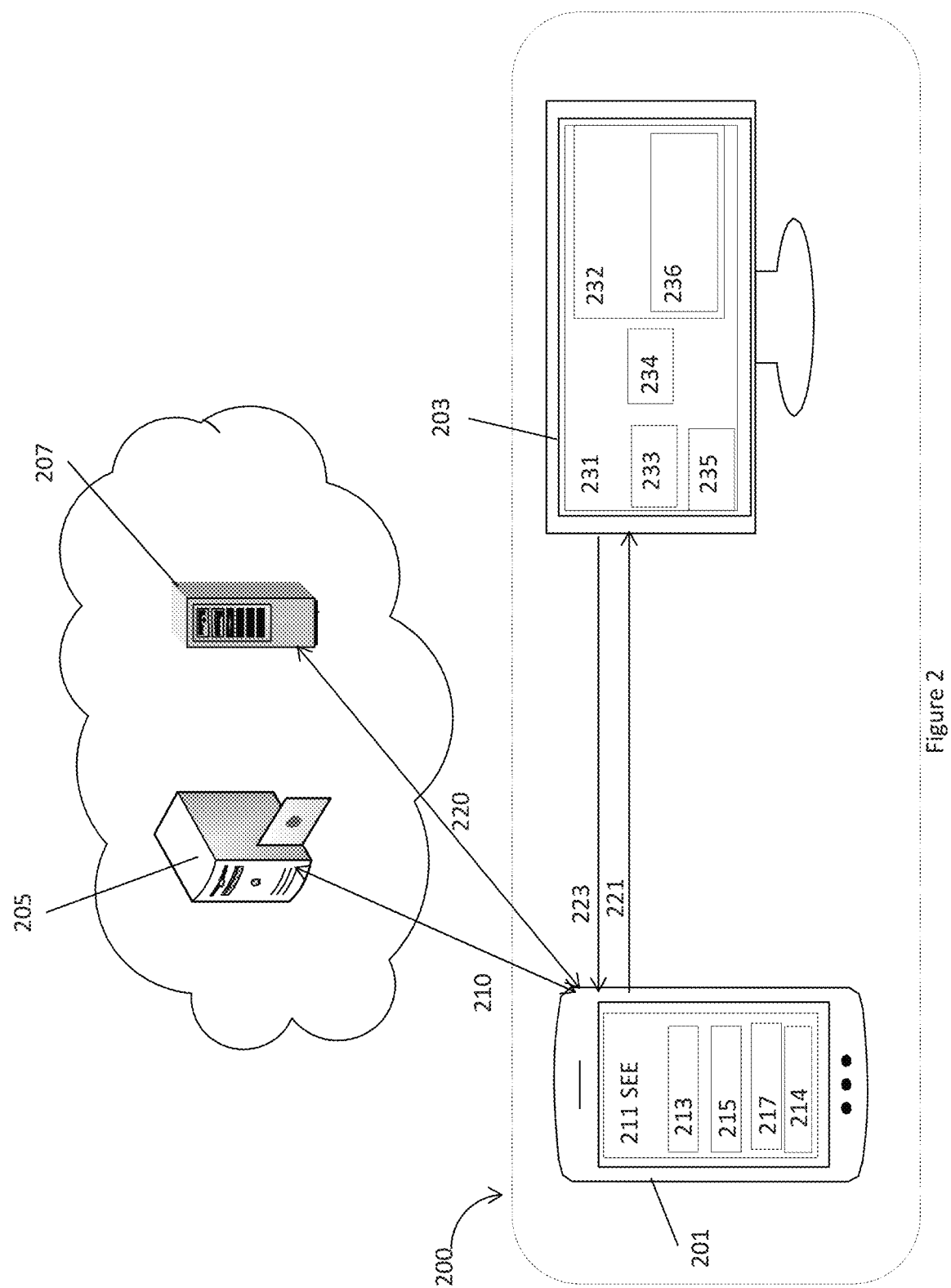
FIG. 2 illustrates another example wireless display system including a display receiver device to receive secure DRM content from a display transmitter device with or without transcription, in accordance with various embodiments.

FIG. 2 illustrates another example wireless display system 200 including a display receiver device 203 to receive secure DRM content from a display transmitter device 201 with or without transcription, in accordance with various embodiments. The wireless display system 200 may be similar to the wireless display system 100 shown in FIG. 1.

In embodiments, the wireless display system 200 may include the display transmitter device 201 and the display receiver device 203, which may be similar to the display transmitter device 101 and the display receiver device 103 shown in FIG. 1. The display transmitter device 201 may communicate with a license server 205 through a channel 210, and communicate with a content server 207 through a channel 220. The display transmitter device 201 may communicate with the display receiver device 203 through a forward channel 221 from the display transmitter device 201 to the display receiver device 203, and a backward channel 223 from the display receiver device 203 to the display transmitter device 201, via a wireless display protocol. The wireless display protocol for the forward channel 221 and the backward channel 223 may be different from the protocol for the channel 210 or for the channel 220.

In embodiments, the display transmitter device 201 may include a secure execution environment 211. The secure execution environment 211 may further include secure DRM content 213, a decryption and presentation license 215, a content download license 217, and optionally, clear DRM content 214. The display receiver device 203 may include a secure execution environment 231. The secure execution environment 231 may further include secure DRM content 233 (if decryption of secure DRM content 233 is supported), clear DRM content 234, and a decryption and presentation license 235. Furthermore, the secure execution environment 231 may include a DRM scheme 232, which may include a DRM credential 236.

In embodiments, the secure execution environment 211 may include the content download license 217, which may be used to download the secure DRM content 213 from the content server 207. The content download license 217 may be acquired from the license server 205, using the DRM scheme 232 and the DRM credential 236 of the display receiver device 203, and/or information and identification of the display transmitter device 201.

In embodiments, the secure execution environment 211 may include the secure DRM content 213 and the decryption and presentation license 215, both of which may be transferred to the display receiver device 203 to become the secure DRM content 233 and the decryption and presentation license 235 within the secure execution environment 231. Furthermore, the secure execution environment 211 may include the clear DRM content 214, which may be obtained by decrypting the secure DRM content 213 (if decryption of secure content 213 is not supported by display receiver device 203). The display transmitter device 201 may decrypt the secure DRM content 213 to obtain the clear DRM content 214 when the secure DRM content 213 may not supported by the DRM scheme 232 of the display receiver device 203.

In embodiments, the secure execution environment 231 may include the secure DRM content 233 and the decryption and presentation license 235, which may be received from the display transmitter device 201. The secure execution environment 231 may include the clear DRM content 234, which may be obtained by decrypting the secure DRM content 233 based on the decryption and presentation license 235.

Figure 3:
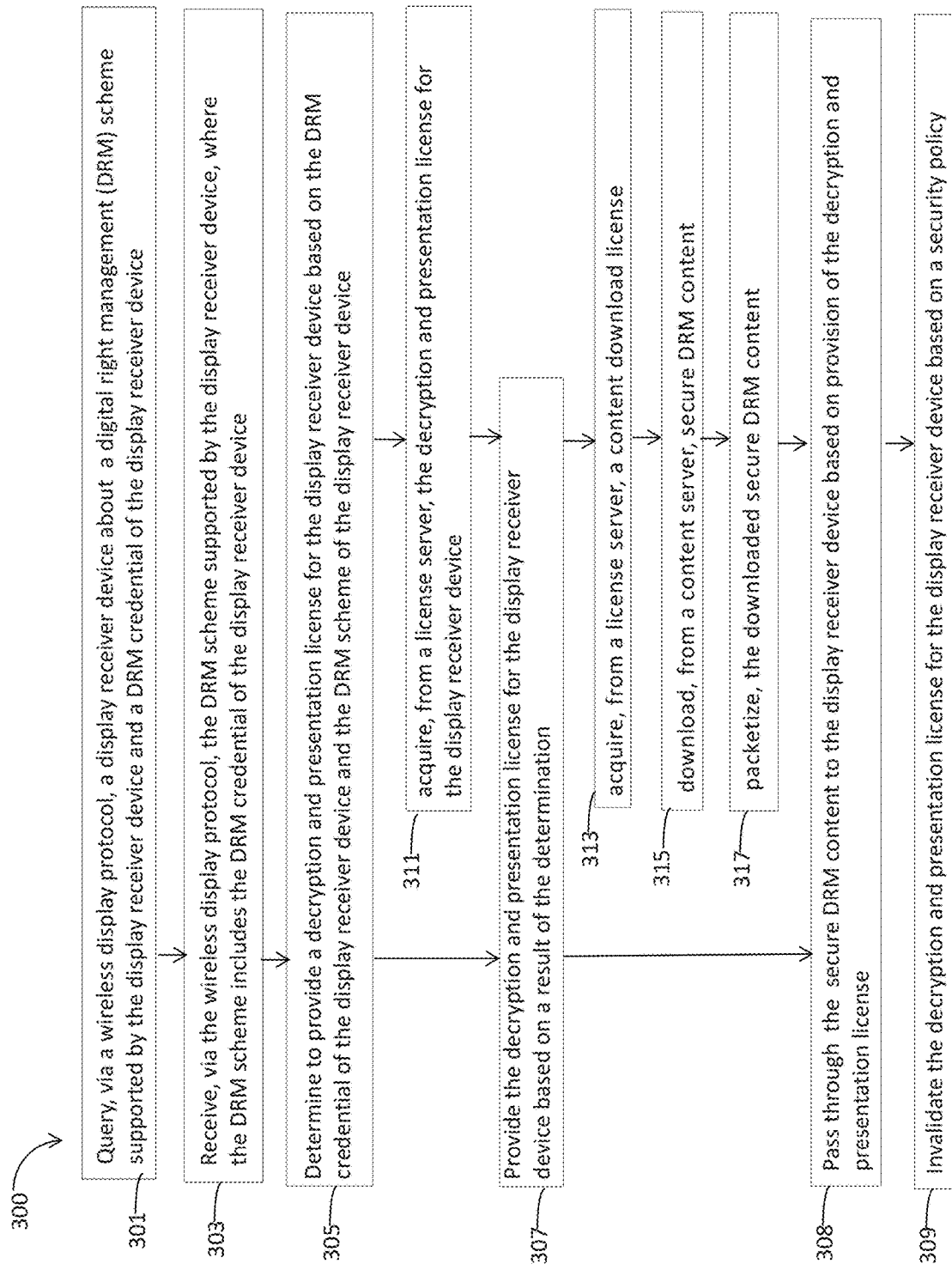
FIG. 3 illustrates an example process for a display transmitter device to pass through secure DRM content to a display receiver device without transcription, in accordance with various embodiments.

FIG. 3 illustrates an example process 300 for a display transmitter device to pass through secure DRM content to a display receiver device without transcription, in accordance with various embodiments. In embodiments, the process 300 may be a process performed by the display transmitter device 101 in FIG. 1, or the display transmitter device 201 in FIG. 2, and performed by the secure execution environment 111 or the secure execution environment 211.

The process 300 may start at an interaction 301. During the interaction 301, the display transmitter device may query, via a wireless display protocol, a display receiver device about a DRM scheme supported by the display receiver device and a DRM credential of the display receiver device. For example, at the interaction 301, the display transmitter device 101 may query, via a wireless display protocol, the display receiver device 103 about a DRM scheme supported by the display receiver device 103 and a DRM credential of the display receiver device 103. In embodiments, the display transmitter device 101 may query through RTSP M3 message the DRM scheme supported by the display receiver device 103. Currently the RTSP M3 message may only support video and audio codec capabilities, using wfd_video_formats and wfd_audio_formats M3 tags, as specified by Miracast R1. In embodiments, the RTSP M3 message may be extended to include a new tag, wfd-digital-rights-management-support, described below, to identify the DRM scheme supported by the display receiver device 103:

--- wfd-digital-rights-management-support =
    "wfd_digital_rights_management_support:" SP drm- spec
drm-spec                 = "none" / drm-scheme SP
version drm-scheme      = "Widevine" / "Playready"
version                  = DIGIT During an interaction 303, the display transmitter device may receive, via the wireless display protocol, the DRM scheme supported by the display receiver device, where the DRM scheme includes the DRM credential of the display receiver device. For example, at the interaction 303, the display transmitter device 101 may receive the DRM scheme supported by the display receiver device 103. The display transmitter device 101 may receive the DRM scheme through a RTSP M3 response message, which may include the DRM credentials of the display receiver device 103, the supported resolutions, any revocation list, etc., in the form of a binary blob.

During an interaction 305, the display transmitter device may determine to provide a decryption and presentation license for the display receiver device based on the DRM credential of the display receiver device and the DRM scheme of the display receiver device. For example, at the interaction 305, the display transmitter device 101 may determine to provide a decryption and presentation license for the display receiver device 103 based on the DRM credential of the display receiver device 103 and the DRM scheme of the display receiver device 103. In embodiments, the display transmitter device 101 may determine, based on the DRM credential of the display receiver device 103, not to provide a decryption and presentation license for the display receiver device 103 when the display receiver device 103 is in a revocation list. Similarly, the display transmitter device 101 may determine not to provide a decryption and presentation license for the display receiver device 103 when the secure DRM content is not supported by the DRM scheme of the display receiver device 103. In some embodiments, the display transmitter device 101 may determine to provide a decryption and presentation license for the display receiver device 103. In addition, a security policy for invalidating the decryption and presentation license may be determined during the interaction 305 as well.

During an interaction 311, the display transmitter device may acquire, from a license server, the decryption and presentation license for the display receiver device. For example, the display transmitter device 101 may acquire from the license server 105 the decryption and presentation license for the display receiver device 103. The display transmitter device 101 may negotiate with the license server 105 to acquire the decryption and presentation license for the display receiver device 103. In detail, the display transmitter device 101 may send the DRM credential of the display receiver device 103, received in RTSP M3 response message during the interaction 303, to the license server 105. The display transmitter device 101 may further sign the binary blob containing the DRM credential of the display receiver device 103 with its own public key, known to the license server 105, to establish root of trust with the license server 105. The license server 105 may check the DRM credential of the display receiver device 103 to determine if the decryption and presentation license may be issued and at what level (e.g. content resolution) of content access may be allowed. Alternatively, the display transmitter device 101 may act as a license server and may generate the decryption and presentation license locally.

During an interaction 307, the display transmitter device may provide the decryption and presentation license for the display receiver device based on a result of the determination. For example, at the interaction 307, the display transmitter device 101 may provide the decryption and presentation license for the display receiver device 103 based on a result of the determination. In embodiments, the decryption and presentation license for the display receiver device 103 may be valid for a predetermined time period and it automatically expires by the predetermined time period. Additionally or alternatively, the decryption and presentation license for the display receiver device 103 may be valid for a predetermined area and it automatically expires when the display receiver device 103 is out of the predetermined area.

Additionally and optionally, during an interaction 313, the display transmitter device may acquire, from a license server, a content download license. During an interaction 315, the display transmitter device may download, from a content server, secure DRM content. During an interaction 317, the display transmitter device may packetize, the downloaded secure DRM content. For example, the display transmitter device 101 may acquire, from the license server 105, a content download license. The display transmitter device 101 may download, from a content server, e.g., the content server 207, the secure DRM content using hypertext transfer protocol Secure (HTTPS) or other secure channel. The display transmitter device 101 may further packetize the downloaded secure DRM content without decrypting the secure DRM content. Alternatively, the secure DRM content may be generated locally by the display transmitter device.

During an interaction 308, the display transmitter device may pass through the secure DRM content to the display receiver device based on provision of the decryption and presentation license. For example, at the interaction 309, the display transmitter device 101 may pass through the secure DRM content to the display receiver device 103 based on provision of the decryption and presentation license. The secure DRM content may be passed through over the forward channel 221, which may be a Miracast P2P channel.

During an interaction 309, the display transmitter device may invalidate the decryption and presentation license for the display receiver device based on a security policy. For example, at the interaction 309, the display transmitter device 101 may invalidate the decryption and presentation license for the display receiver device 103 based on a security policy. In embodiments, the security policy for invalidating the decryption and presentation license may be determined based on a proximity of the display receiver device and the display transmitter device, a time duration for the decryption and presentation license, or a way the display receiver device renders the secure DRM content.

Figure 4:
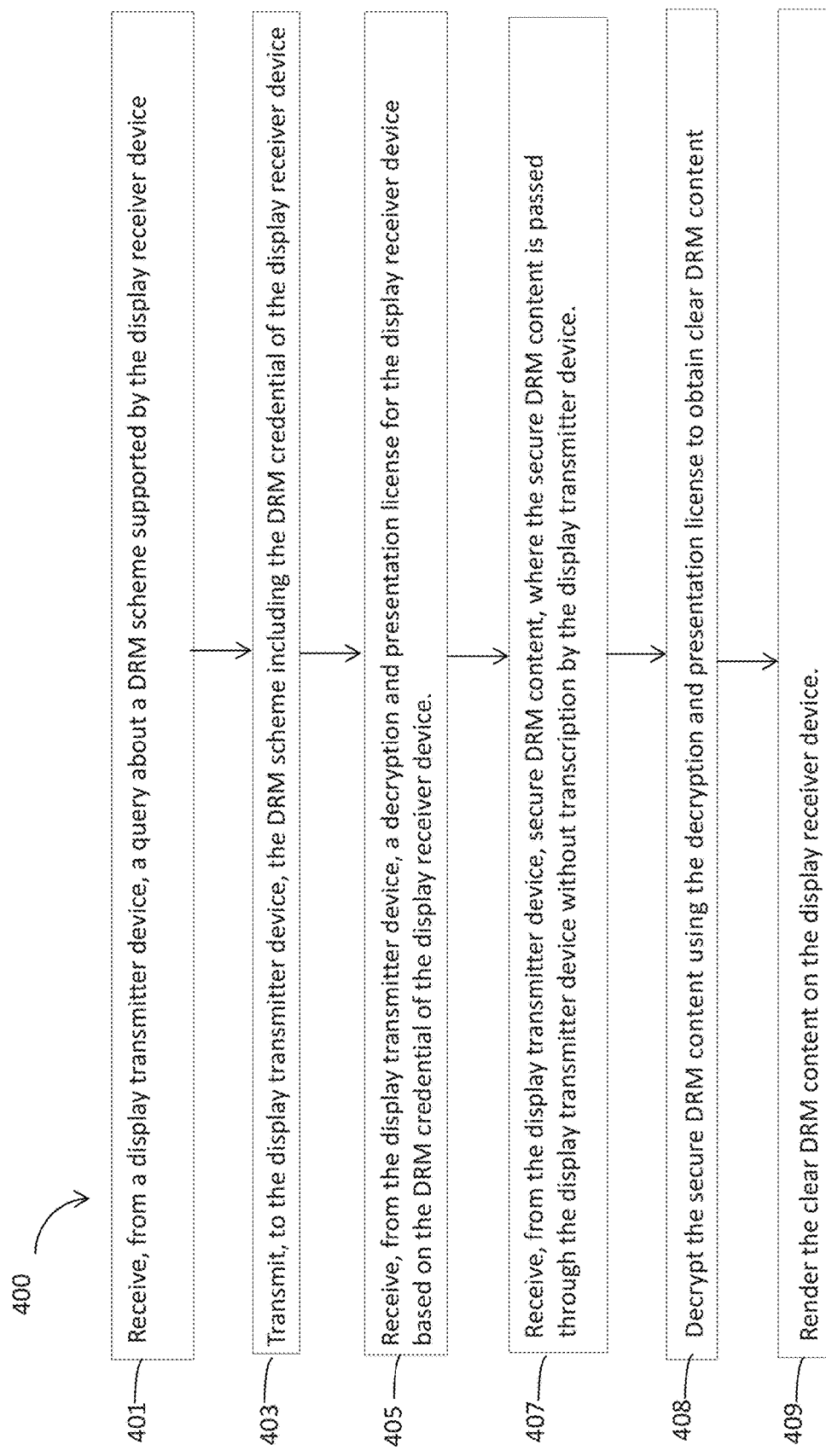
FIG. 4 illustrates an example process for a display receiver device to receive secure DRM content from a display transmitter device without transcription by the display transmitter device, in accordance with various embodiments.

FIG. 4 illustrates an example process 400 for a display receiver device to receive secure DRM content from a display transmitter device without transcription by the display transmitter device, in accordance with various embodiments. In embodiments, the process 400 may be a process performed by the display receiver device 103 in FIG. 1, or the display receiver device 203 in FIG. 2, and performed by the performed by the secure execution environment 131 or the secure execution environment 231.

The process 400 may start at an interaction 401. During the interaction 401, the display receiver device may receive, from a display transmitter device, a query about a DRM scheme supported by the display receiver device. For example, at the interaction 401, the display receiver device 103 may receive, from the display transmitter device 101, a query about a DRM scheme supported by the display receiver device 103. The query may be carried by an extended RTSP M3 message including the new tag, wfd-digital-rights-management-support, as illustrated for the interaction 301.

During an interaction 403, the display receiver device may transmit, to the display transmitter device, the DRM scheme including the DRM credential of the display receiver device. For example, at the interaction 403, the display receiver device 103 may transmit, to the display transmitter device 101, the DRM scheme including the DRM credential of the display receiver device 103. The DRM scheme including the DRM credential may be transmitted in the form of a binary blob, as illustrated for the interaction 303.

During an interaction 405, the display receiver device may receive, from the display transmitter device, a decryption and presentation license for the display receiver device based on the DRM credential of the display receiver device. For example, at the interaction 405, the display receiver device 103 may receive, from the display transmitter device 101, a decryption and presentation license for the display receiver device 103 based on the DRM credential of the display receiver device 103, as illustrated in the interaction 307.

During an interaction 407, the display receiver device may receive, from the display transmitter device, secure DRM content, where the secure DRM content is passed through the display transmitter device without transcription by the display transmitter device. For example, at the interaction 407, the display receiver device 103 may receive, from the display transmitter device 101, secure DRM content, where the secure DRM content is passed through the display transmitter device 101 without transcription by the display transmitter device 101, as illustrated in the interaction 308.

During an interaction 408, the display receiver device may decrypt the secure DRM content using the decryption and presentation license to obtain clear DRM content. For example, at the interaction 407, the display receiver device 103 may decrypt the secure DRM content using the decryption and presentation license to obtain clear DRM content.

During an interaction 409, the display receiver device may render the clear DRM content on the display receiver device. For example, at the interaction 407, the display receiver device 103 may render the clear DRM content on the display receiver device.

Figure 5:
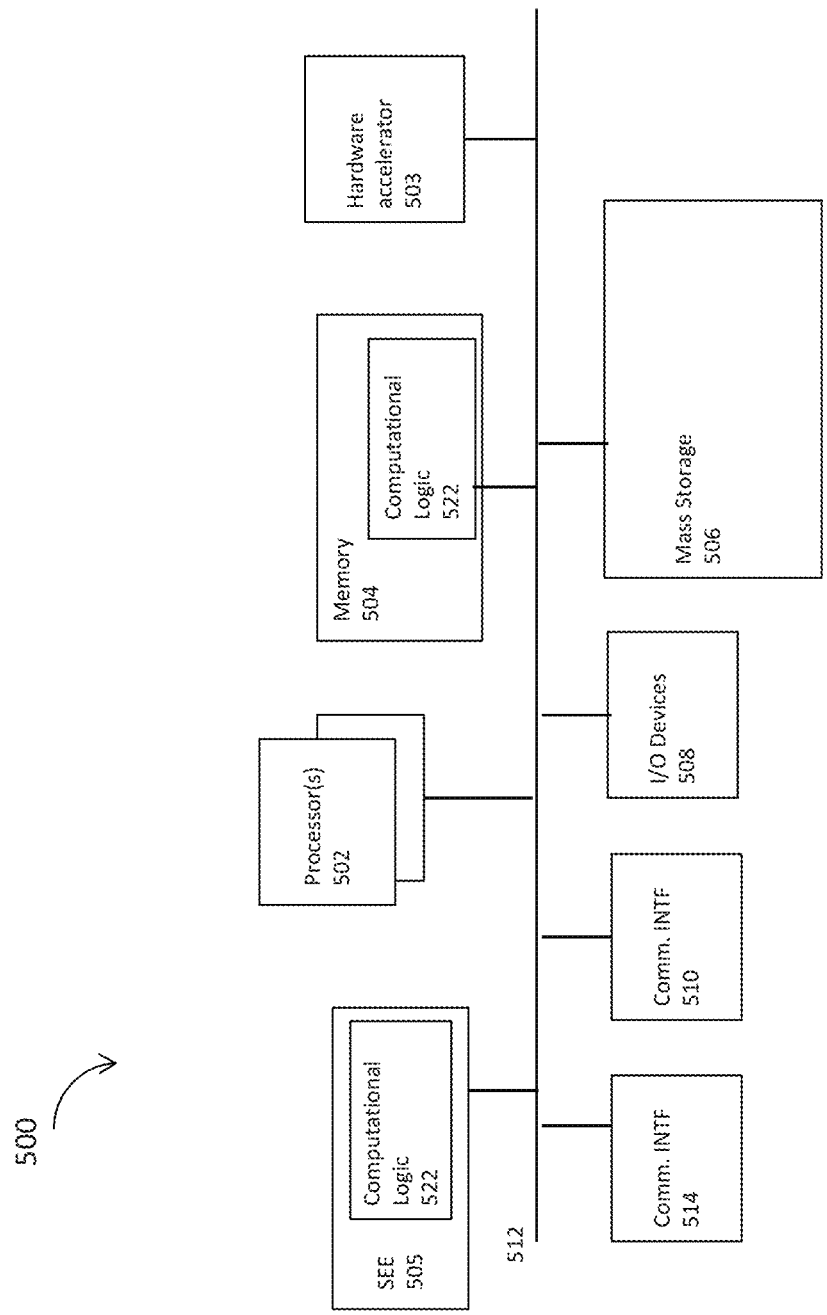
FIG. 5 illustrates an example device suitable for use to practice various aspects of the present disclosure, in accordance with various embodiments.

FIG. 5 illustrates an example communication device 500 that may be suitable as a device to practice selected aspects of the present disclosure. The device 500 may be an example of the display transmitter device 101, the display transmitter device 201, the display receiver device 103, or the display receiver device 203, as shown in FIG. 1 and FIG. 2. As shown, the device 500 may include one or more processors 502, each having one or more processor cores, or and optionally, a hardware accelerator 503 (which may be an ASIC or a FPGA). Additionally, the device 500 may include a memory 504, which may be any one of a number of known persistent storage medium, and mass storage 506. In addition, the 500 may include input/output devices 508. Furthermore, the device 500 may include communication interfaces 510 and 514. Communication interfaces 510 and 514 may be any one of a number of known communication interfaces. The elements may be coupled to each other via system bus 512, which may represent one or more buses. In the case of multiple buses, they may be bridged by one or more bus bridges (not shown). In addition, the device 500 may include a secure execution environment (SEE) 505, which may be an example of the secure execution environment 111, the secure execution environment 131, the secure execution environment 211, or the secure execution environment 231, as shown in FIG. 1 and FIG. 2.

Each of these elements may perform its conventional functions known in the art. In particular, SEE 505 may be employed to store and host execution of programming instructions implementing the operations associated with providing or receiving DRM secure content implemented in software, as described in connection with FIGS. 1-4, and/or other functions, collectively referred to as computational logic 522 that provides the capability of the embodiments described in the current disclosure. The various elements may be implemented by assembler instructions supported by processor(s) 502 or high-level languages, such as, for example, C, that can be compiled into such instructions. Operations associated with a display receiver device to receive secure DRM content from a display transmitter device not implemented in software may be implemented in hardware, e.g., via hardware accelerator 503. Aspect of operations associated with providing or receiving DRM secure content not implemented in software, as described in connection with FIGS. 1-4, may be implements in the hardware accelerator.

The number, capability and/or capacity of these elements 502-522 may vary, depending on the number of other devices the device 500 is configured to support. Otherwise, the constitutions of elements 502-522 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 6:
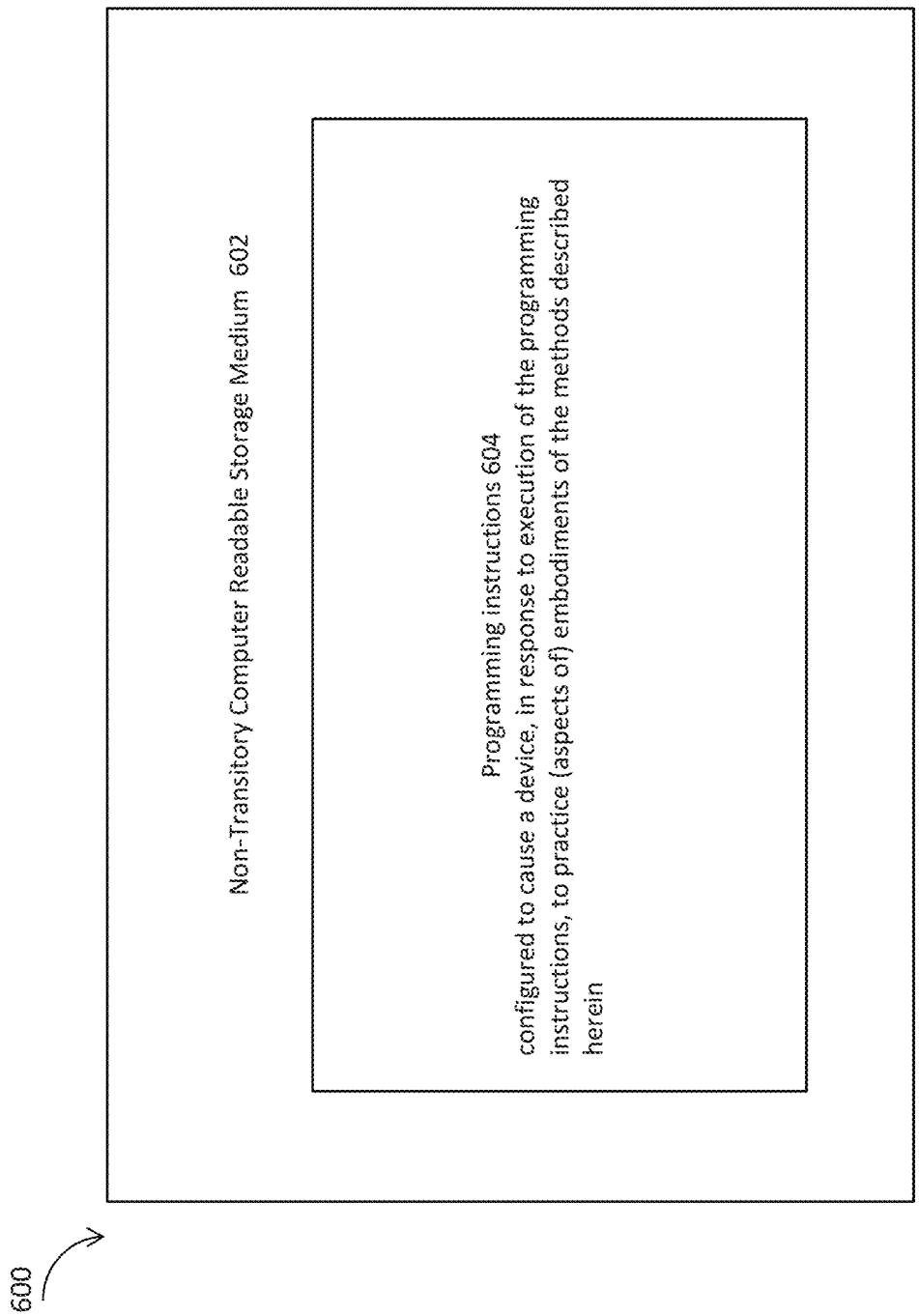
FIG. 6 illustrates a storage medium having instructions for practicing methods described with references to FIGS. 1-5, in accordance with various embodiments.

Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., device 500, in response to execution of the programming instructions in a SEE, to perform, e.g., various operations associated with the display transmitter device 101, the display transmitter device 201, the display receiver device 103, or the display receiver device 203, as shown in FIG. 1 and FIG. 2.

In alternate embodiments, programming instructions 604 may be disposed on multiple computer-readable non-transitory storage media 602 instead. In alternate embodiments, programming instructions 604 may be disposed on computer-readable transitory storage media 602, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include a display transmitter device for provision of display content to a display receiver device, comprising: one or more processors; a secure execution environment to operate on the one or more processors to: receive, via a wireless display protocol, a digital right management (DRM) scheme supported by the display receiver device, wherein the DRM scheme includes a DRM credential of the display receiver device; determine to provide a decryption and presentation license for the display receiver device based on the DRM credential of the display receiver device, wherein the decryption and presentation license is for decryption and presentation of secure DRM content, and the secure DRM content is supported by the DRM scheme of the display receiver device; provide the decryption and presentation license based on a result of the determination; and pass through the secure DRM content to the display receiver device based on provision of the decryption and presentation license, wherein the secure DRM content is passed through the display transmitter device without transcription by the display transmitter device.

Example 2 may include the display transmitter device of example 1 and/or some other examples herein, wherein the secure execution environment is further to: acquire, from a license server, the decryption and presentation license for the display receiver device after the secure execution environment has determined to provide the decryption and presentation license for the display receiver device, and before the secure execution environment is to provide the decryption and presentation license to the display receiver device, wherein the decryption and presentation license is determined by the license server based on the DRM credential of the display receiver device.

Example 3 may include the display transmitter device of example 1 and/or some other examples herein, wherein the secure execution environment is further to: acquire, from a license server, a content download license; download, from a content server, the secure DRM content; packetize, the downloaded secure DRM content; and pass through without transcription the packetized secure DRM content to the display receiver device.

Example 4 may include the display transmitter device of example 1 and/or some other examples herein, wherein the secure execution environment is further to: query the display receiver device about the DRM scheme supported by the display receiver device and the DRM credential of the display receiver device before the secure execution environment is to receive the DRM scheme supported by the display receiver device and the DRM credential of the display receiver device.

Example 5 may include the display transmitter device of example 1 and/or some other examples herein, wherein the decryption and presentation license for the display receiver device is valid for a predetermined time period and it automatically expires by the predetermined time period, or the decryption and presentation license for the display receiver device is valid for a predetermined area and it automatically expires when the display receiver device is out of the predetermined area.

Example 6 may include the display transmitter device of example 1 and/or some other examples herein, wherein the secure execution environment is further to: invalidate the decryption and presentation license for the display receiver device based on a security policy.

Example 7 may include the display transmitter device of example 6 and/or some other examples herein, wherein the security policy is determined based on a proximity of the display receiver device and the display transmitter device, a time duration for the decryption and presentation license, or a way the display receiver device renders the secure DRM content.

Example 8 may include the display transmitter device of example 1 and/or some other examples herein, wherein the secure execution environment is further to: determine, based on the DRM credential of the display receiver device, not to provide a decryption and presentation license for the display receiver device when the display receiver device is in a revocation list.

Example 9 may include the display transmitter device of example 1 and/or some other examples herein, wherein the secure execution environment is further to: determine not to provide a decryption and presentation license for the display receiver device when the secure DRM content is not supported by the DRM scheme of the display receiver device; and decrypt the secure DRM content and render the secure DRM content for the display receiver device.

Example 10 may include the display transmitter device of any one of examples 1-9 and/or some other examples herein, wherein the wireless display protocol is a Miracast protocol or a wireless display (WiDi) protocol.

Example 11 may include the display transmitter device of any one of examples 1-9 and/or some other examples herein, wherein the secure execution environment is to receive the DRM scheme and the DRM credential of the display receiver device by a real time streaming protocol (RTSP) M3 message.

Example 12 may include the display transmitter device of any one of examples 1-9 and/or some other examples herein, wherein the secure execution environment is to pass through the secure DRM content to the display receiver device by a Miracast™ peer-to-peer (P2P) channel.

Example 13 may include a display receiver device for wireless provision of display content from a display transmitter device, comprising: one or more processors; a secure execution environment to operate on the one or more processors to: transmit, via a wireless display protocol, to the display transmitter device, a digital right management (DRM) scheme supported by the display receiver device, wherein the DRM scheme includes a DRM credential of the display receiver device; receive, from the display transmitter device, a decryption and presentation license for the display receiver device based on the DRM credential of the display receiver device, wherein the decryption and presentation license is for decryption and presentation of secure DRM content; and receive, from the display transmitter device, the secure DRM content, wherein the secure DRM content is passed through the display transmitter device without transcription by the display transmitter device.

Example 14 may include the display receiver device of example 13 and/or some other examples herein, wherein the secure execution environment is further to: decrypt the secure DRM content using the decryption and presentation license to obtain clear DRM content; and render the clear DRM content on the display receiver device.

Example 15 may include the display receiver device of example 13 and/or some other examples herein, wherein the secure execution environment is further to: receive, from the display transmitter device, a query about the DRM scheme supported by the display receiver device, before the secure execution environment is to transmit to the display transmitter device the DRM scheme.

Example 16 may include the display receiver device of example 13 and/or some other examples herein, wherein the secure DRM content is downloaded from a content server by the display transmitter device.

Example 17 may include the display receiver device of example 13 and/or some other examples herein, wherein the decryption and presentation license for the display receiver device is valid for a predetermined time period and it automatically expires by the predetermined time period, or the decryption and presentation license for the display receiver device is valid for a predetermined area and it automatically expires when the display receiver device is out of the predetermined area.

Example 18 may include the display receiver device of example 13 and/or some other examples herein, wherein the secure execution environment is further to: receive, from the display transmitter device, a command to invalidate the decryption and presentation license for the display receiver device based on a security policy.

Example 19 may include the display receiver device of any one of examples 13-18 and/or some other examples herein, wherein the wireless display protocol is a Miracast protocol or a wireless display (WiDi) protocol.

Example 20 may include the display receiver device of any one of examples 13-18 and/or some other examples herein, wherein the secure execution environment is to receive a query about the DRM scheme and the DRM credential of the display receiver device by a real time streaming protocol (RTSP) M3 message.

Example 21 may include the display receiver device of any one of examples 13-18 and/or some other examples herein, wherein the secure execution environment is to receive the secure DRM content from the display transmitter device by a Miracast™ peer-to-peer (P2P) channel.

Example 22 may include the display receiver device of any one of examples 13-18 and/or some other examples herein, wherein the secure DRM content includes music, movie, photo, or video content, and the content is encrypted by a DRM software.

Example 23 may include a wireless display system, comprising: a display transmitter device; and a display receiver device to communicate with the display transmitter device; wherein the display receiver device is to: communicate to the display transmitter device, via a wireless display protocol, a digital right management (DRM) scheme supported by the display receiver device, wherein the DRM scheme includes a DRM credential of the display receiver device; receive, from the display transmitter device, a decryption and presentation license for the display receiver device based on the DRM credential of the display receiver device, wherein the decryption and presentation license is for decryption and presentation of secure DRM content; and receive, from the display transmitter device, the secure DRM content; and wherein the display transmitter device is to: determine to provide the decryption and presentation license for the display receiver device based on the DRM credential of the display receiver device and the DRM scheme of the display receiver device; provide, to the display receiver device, the decryption and presentation license for the display receiver device based on a result of the determination; and pass through the secure DRM content to the display receiver device, wherein the secure DRM content is passed through without transcription by the display transmitter device.

Example 24 may include the wireless display system of example 23 and/or some other examples herein, wherein the display transmitter device is further to: acquire, from a license server, the decryption and presentation license for the display receiver device after the display transmitter device has determined to provide the decryption and presentation license for the display receiver device, and before the display transmitter device is to provide the decryption and presentation license to the display receiver device, wherein the decryption and presentation license is determined by the license server based on the DRM credential of the display receiver device.

Example 25 may include the wireless display system of any one of examples 23-24 and/or some other examples herein, wherein the display transmitter device is further to: acquire, from a license server, a content download license; download, from a content server, the secure DRM content; packetize, the downloaded secure DRM content; and pass through without transcription the packetized secure DRM content to the display receiver device.

Example 26 may include a method for provision of display content to a display receiver device, comprising: receiving, by a secure execution environment, via a wireless display protocol, a digital right management (DRM) scheme supported by the display receiver device, wherein the DRM scheme includes a DRM credential of the display receiver device; determining, by the secure execution environment, to provide a decryption and presentation license for the display receiver device based on the DRM credential of the display receiver device, wherein the decryption and presentation license is for decryption and presentation of secure DRM content, and the secure DRM content is supported by the DRM scheme of the display receiver device; providing, by the secure execution environment, the decryption and presentation license based on a result of the determination; and passing through, by the secure execution environment, the secure DRM content to the display receiver device based on provision of the decryption and presentation license, wherein the secure DRM content is passed through the display transmitter device without transcription by the display transmitter device.

Example 27 may include the method of example 26 and/or some other examples herein, further comprising: acquiring, from a license server, the decryption and presentation license for the display receiver device after the secure execution environment has determined to provide the decryption and presentation license for the display receiver device, and before the secure execution environment is to provide the decryption and presentation license to the display receiver device, wherein the decryption and presentation license is determined by the license server based on the DRM credential of the display receiver device.

Example 28 may include the method of example 26 and/or some other examples herein, further comprising: acquiring, from a license server, a content download license; downloading, from a content server, the secure DRM content; packetizing, the downloaded secure DRM content; and passing through without transcription the packetized secure DRM content to the display receiver device.

Example 29 may include the method of example 26 and/or some other examples herein, further comprising: querying the display receiver device about the DRM scheme supported by the display receiver device and the DRM credential of the display receiver device before the secure execution environment is to receive the DRM scheme supported by the display receiver device and the DRM credential of the display receiver device.

Example 30 may include the method of example 26 and/or some other examples herein, wherein the decryption and presentation license for the display receiver device is valid for a predetermined time period and it automatically expires by the predetermined time period, or the decryption and presentation license for the display receiver device is valid for a predetermined area and it automatically expires when the display receiver device is out of the predetermined area.

Example 31 may include the method of example 26 and/or some other examples herein, further comprising: invalidating the decryption and presentation license for the display receiver device based on a security policy.

Example 32 may include the method of example 31 and/or some other examples herein, wherein the security policy is determined based on a proximity of the display receiver device and the display transmitter device, a time duration for the decryption and presentation license, or a way the display receiver device renders the secure DRM content.

Example 33 may include the method of example 26 and/or some other examples herein, further comprising: determining, based on the DRM credential of the display receiver device, not to provide a decryption and presentation license for the display receiver device when the display receiver device is in a revocation list.

Example 34 may include the method of example 26 and/or some other examples herein, further comprising: determining not to provide a decryption and presentation license for the display receiver device when the secure DRM content is not supported by the DRM scheme of the display receiver device; and decrypting the secure DRM content and render the secure DRM content for the display receiver device.

Example 35 may include the method of any one of examples 26-34 and/or some other examples herein, wherein the wireless display protocol is a Miracast protocol or a wireless display (WiDi) protocol.

Example 36 may include the method of any one of examples 26-34 and/or some other examples herein, wherein the secure execution environment is to receive the DRM scheme and the DRM credential of the display receiver device by a real time streaming protocol (RTSP) M3 message.

Example 37 may include the method of any one of examples 26-34 and/or some other examples herein, wherein the secure execution environment is to pass through the secure DRM content to the display receiver device by a Miracast™ peer-to-peer (P2P) channel.

Example 38 may include a method for wireless provision of display content from a display transmitter device, comprising: transmitting, by a secure execution environment, via a wireless display protocol, to the display transmitter device, a digital right management (DRM) scheme supported by the display receiver device, wherein the DRM scheme includes a DRM credential of the display receiver device; receiving, by the secure execution environment, from the display transmitter device, a decryption and presentation license for the display receiver device based on the DRM credential of the display receiver device, wherein the decryption and presentation license is for decryption and presentation of secure DRM content; and receiving, by the secure execution environment, from the display transmitter device, the secure DRM content, wherein the secure DRM content is passed through the display transmitter device without transcription by the display transmitter device.

Example 39 may include the method of example 38 and/or some other examples herein, further comprising: decrypting the secure DRM content using the decryption and presentation license to obtain clear DRM content; and rendering the clear DRM content on the display receiver device.

Example 40 may include the method of example 38 and/or some other examples herein, further comprising: receiving, from the display transmitter device, a query about the DRM scheme supported by the display receiver device, before the secure execution environment is to transmit to the display transmitter device the DRM scheme.

Example 41 may include the method of example 38 and/or some other examples herein, wherein the secure DRM content is downloaded from a content server by the display transmitter device.

Example 42 may include the method of example 38 and/or some other examples herein, wherein the decryption and presentation license for the display receiver device is valid for a predetermined time period and it automatically expires by the predetermined time period, or the decryption and presentation license for the display receiver device is valid for a predetermined area and it automatically expires when the display receiver device is out of the predetermined area.

Example 43 may include the method of example 38 and/or some other examples herein, further comprising: receiving, from the display transmitter device, a command to invalidate the decryption and presentation license for the display receiver device based on a security policy.

Example 44 may include the method of any one of examples 38-43 and/or some other examples herein, wherein the wireless display protocol is a Miracast protocol or a wireless display (WiDi) protocol.

Example 45 may include the method of any one of examples 38-43 and/or some other examples herein, wherein the secure execution environment is to receive a query about the DRM scheme and the DRM credential of the display receiver device by a real time streaming protocol (RTSP) M3 message.

Example 46 may include the method of any one of examples 38-43 and/or some other examples herein, wherein the secure execution environment is to receive the secure DRM content from the display transmitter device by a Miracast™ peer-to-peer (P2P) channel.

Example 47 may include the method of any one of examples 38-43 and/or some other examples herein, wherein the secure DRM content includes music, movie, photo, or video content, and the content is encrypted by a DRM software.

Example 48 may include one or more computer-readable media having instructions for a computer device to handle errors, upon execution of the instructions by one or more processors, to perform the method of any one of claims 26-47.

Example 49 may include an apparatus for provision of display content to a display receiver device, comprising: means for receiving, via a wireless display protocol, a digital right management (DRM) scheme supported by the display receiver device, wherein the DRM scheme includes a DRM credential of the display receiver device; means for determining to provide a decryption and presentation license for the display receiver device based on the DRM credential of the display receiver device, wherein the decryption and presentation license is for decryption and presentation of secure DRM content, and the secure DRM content is supported by the DRM scheme of the display receiver device; means for providing the decryption and presentation license based on a result of the determination; and means for passing through the secure DRM content to the display receiver device based on provision of the decryption and presentation license, wherein the secure DRM content is passed through the display transmitter device without transcription by the display transmitter device.

Example 50 may include the apparatus of example 49 and/or some other examples herein, further comprising: means for acquiring, from a license server, the decryption and presentation license for the display receiver device after the secure execution environment has determined to provide the decryption and presentation license for the display receiver device, and before the secure execution environment is to provide the decryption and presentation license to the display receiver device, wherein the decryption and presentation license is determined by the license server based on the DRM credential of the display receiver device.

Example 51 may include the apparatus of example 49 and/or some other examples herein, further comprising: means for acquiring, from a license server, a content download license; means for downloading, from a content server, the secure DRM content; means for packetizing, the downloaded secure DRM content; and means for passing through without transcription the packetized secure DRM content to the display receiver device.

Example 52 may include the apparatus of example 49 and/or some other examples herein, further comprising: means for querying the display receiver device about the DRM scheme supported by the display receiver device and the DRM credential of the display receiver device before the secure execution environment is to receive the DRM scheme supported by the display receiver device and the DRM credential of the display receiver device.

Example 53 may include the apparatus of example 49 and/or some other examples herein, wherein the decryption and presentation license for the display receiver device is valid for a predetermined time period and it automatically expires by the predetermined time period, or the decryption and presentation license for the display receiver device is valid for a predetermined area and it automatically expires when the display receiver device is out of the predetermined area.

Example 54 may include the apparatus of example 49 and/or some other examples herein, further comprising: means for invalidating the decryption and presentation license for the display receiver device based on a security policy.

Example 55 may include the apparatus of example 49 and/or some other examples herein, wherein the security policy is determined based on a proximity of the display receiver device and the display transmitter device, a time duration for the decryption and presentation license, or a way the display receiver device renders the secure DRM content.

Example 56 may include the apparatus of example 49 and/or some other examples herein, further comprising: means for determining, based on the DRM credential of the display receiver device, not to provide a decryption and presentation license for the display receiver device when the display receiver device is in a revocation list.

Example 57 may include the apparatus of example 49 and/or some other examples herein, further comprising: means for determining not to provide a decryption and presentation license for the display receiver device when the secure DRM content is not supported by the DRM scheme of the display receiver device; and means for decrypting the secure DRM content and render the secure DRM content for the display receiver device.

Example 58 may include the apparatus of any one of examples 49-57 and/or some other examples herein, wherein the wireless display protocol is a Miracast protocol or a wireless display (WiDi) protocol.

Example 59 may include the apparatus of any one of examples 49-57 and/or some other examples herein, wherein the secure execution environment is to receive the DRM scheme and the DRM credential of the display receiver device by a real time streaming protocol (RTSP) M3 message.

Example 60 may include the apparatus of any one of examples 49-57 and/or some other examples herein, wherein the secure execution environment is to pass through the secure DRM content to the display receiver device by a Miracast™ peer-to-peer (P2P) channel.

Example 61 may include an apparatus for wireless provision of display content from a display transmitter device, comprising: means for transmitting, via a wireless display protocol, to the display transmitter device, a digital right management (DRM) scheme supported by the display receiver device, wherein the DRM scheme includes a DRM credential of the display receiver device; means for receiving, from the display transmitter device, a decryption and presentation license for the display receiver device based on the DRM credential of the display receiver device, wherein the decryption and presentation license is for decryption and presentation of secure DRM content; and means for receiving, from the display transmitter device, the secure DRM content, wherein the secure DRM content is passed through the display transmitter device without transcription by the display transmitter device.

Example 62 may include the apparatus of example 61 and/or some other examples herein, further comprising: means for decrypting the secure DRM content using the decryption and presentation license to obtain clear DRM content; and means for rendering the clear DRM content on the display receiver device.

Example 63 may include the apparatus of example 61 and/or some other examples herein, further comprising: means for receiving, from the display transmitter device, a query about the DRM scheme supported by the display receiver device, before the secure execution environment is to transmit to the display transmitter device the DRM scheme.

Example 64 may include the apparatus of example 61 and/or some other examples herein, wherein the secure DRM content is downloaded from a content server by the display transmitter device.

Example 65 may include the apparatus of example 61 and/or some other examples herein, wherein the decryption and presentation license for the display receiver device is valid for a predetermined time period and it automatically expires by the predetermined time period, or the decryption and presentation license for the display receiver device is valid for a predetermined area and it automatically expires when the display receiver device is out of the predetermined area.

Example 66 may include the apparatus of example 61 and/or some other examples herein, further comprising: means for receiving, from the display transmitter device, a command to invalidate the decryption and presentation license for the display receiver device based on a security policy.

Example 67 may include the apparatus of any one of examples 61-66 and/or some other examples herein, wherein the wireless display protocol is a Miracast protocol or a wireless display (WiDi) protocol.

Example 68 may include the apparatus of any one of examples 61-66 and/or some other examples herein, wherein the secure execution environment is to receive a query about the DRM scheme and the DRM credential of the display receiver device by a real time streaming protocol (RTSP) M3 message.

Example 69 may include the apparatus of any one of examples 61-66 and/or some other examples herein, wherein the secure execution environment is to receive the secure DRM content from the display transmitter device by a Miracast™ peer-to-peer (P2P) channel.

Example 70 may include the apparatus of any one of examples 61-66 and/or some other examples herein, wherein the secure DRM content includes music, movie, photo, or video content, and the content is encrypted by a DRM software.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. A display transmitter device for provision of display content to a display, comprising:
   one or more processors;
   a secure execution environment to operate on the one or more processors to:

receive, from a display receiver device having the display, via a wireless display protocol, a digital right management (DRM) scheme supported by the display receiver device, wherein the DRM scheme includes a DRM credential of the display receiver device, and video and audio codec capabilities of the display receiver device;

determine to provide a decryption and presentation license for the display receiver device based on the DRM credential of the display receiver device, wherein the decryption and presentation license is for decryption and presentation of secure DRM content, and the secure DRM content is supported by the DRM scheme of the display receiver device;

provide the decryption and presentation license based on a result of the determination; and pass through the secure DRM content to the display receiver device based on provision of the decryption and presentation license, wherein the secure DRM content is passed through the display transmitter device without transcription by the display transmitter device, and in turn provisioned to the display.

2. The display transmitter device of claim 1, wherein the secure execution environment is further to:

acquire, from a license server, the decryption and presentation license for the display receiver device after the secure execution environment has determined to provide the decryption and presentation license for the display receiver device, and before the secure execution environment is to provide the decryption and presentation license to the display receiver device, wherein the decryption and presentation license is determined by the license server based on the DRM credential of the display receiver device.

3. The display transmitter device of claim 1, wherein the secure execution environment is further to:

acquire, from a license server, a content download license;
download, from a content server, the secure DRM content;
packetize, the downloaded secure DRM content; and
pass through without transcription the packetized secure DRM content to the display receiver device.

4. The display transmitter device of claim 1, wherein the secure execution environment is further to:

query the display receiver device about the DRM scheme supported by the display receiver device and the DRM credential of the display receiver device before the secure execution environment is to receive the DRM scheme supported by the display receiver device and the DRM credential of the display receiver device.

5. The display transmitter device of claim 1, wherein the decryption and presentation license for the display receiver device is valid for a predetermined time period and it automatically expires by the predetermined time period, or the decryption and presentation license for the display receiver device is valid for a predetermined area and it automatically expires when the display receiver device is out of the predetermined area.

6. The display transmitter device of claim 1, wherein the secure execution environment is further to:

invalidate the decryption and presentation license for the display receiver device based on a security policy.

7. The display transmitter device of claim 6, wherein the security policy is determined based on a proximity of the display receiver device and the display transmitter device, a time duration for the decryption and presentation license, or a way the display receiver device renders the secure DRM content.

8. The display transmitter device of claim 1, wherein the secure execution environment is further to:

determine, based on the DRM credential of the display receiver device, not to provide a decryption and presentation license for the display receiver device when the display receiver device is in a revocation list.

9. The display transmitter device of claim 1, wherein the secure execution environment is further to:

determine not to provide a decryption and presentation license for the display receiver device when the secure DRM content is not supported by the DRM scheme of the display receiver device; and decrypt the secure DRM content and render the secure DRM content for the display receiver device.

10. The display transmitter device of claim 1, wherein the wireless display protocol is a Miracast protocol or a wireless display (WiDi) protocol.

11. The display transmitter device of claim 1, wherein the secure execution environment is to receive the DRM scheme and the DRM credential of the display receiver device by a real time streaming protocol (RTSP) M3 message.

12. The display transmitter device of claim 1, wherein the secure execution environment is to pass through the secure DRM content to the display receiver device by a Miracast™ peer-to-peer (P2P) channel.

13. A display receiver device for wireless provision of display content from a display transmitter device, comprising:

one or more processors;
a secure execution environment to operate on the one or more processors to:

transmit, via a wireless display protocol, to the display transmitter device, a digital right management (DRM) scheme supported by the display receiver device having a display, wherein the DRM scheme includes a DRM credential of the display receiver device, and video and audio codec capabilities of the display receiver device;

receive, from the display transmitter device, a decryption and presentation license for the display receiver device based on the DRM credential of the display receiver device, wherein the decryption and presentation license is for decryption and presentation of secure DRM content; and receive, from the display transmitter device, the secure DRM content, wherein the secure DRM content is passed through the display transmitter device without transcription by the display transmitter device, and in turn provisioned to the display.

14. The display receiver device of claim 13, wherein the secure execution environment is further to:

decrypt the secure DRM content using the decryption and presentation license to obtain clear DRM content; and
render the clear DRM content on the display receiver device.

15. The display receiver device of claim 13, wherein the secure execution environment is further to:

receive, from the display transmitter device, a query about the DRM scheme supported by the display receiver device, before the secure execution environment is to transmit to the display transmitter device the DRM scheme.

16. The display receiver device of claim 13, wherein the secure DRM content is downloaded from a content server by the display transmitter device.

17. The display receiver device of claim 13, wherein the decryption and presentation license for the display receiver device is valid for a predetermined time period and it automatically expires by the predetermined time period, or the decryption and presentation license for the display receiver device is valid for a predetermined area and it automatically expires when the display receiver device is out of the predetermined area.

18. The display receiver device of claim 13, wherein the secure execution environment is further to:
receive, from the display transmitter device, a command to invalidate the decryption and presentation license for the display receiver device based on a security policy.

19. The display receiver device of claim 13, wherein the wireless display protocol is a Miracast protocol or a wireless display (WiDi) protocol.

20. The display receiver device of claim 13, wherein the secure execution environment is to receive a query about the DRM scheme and the DRM credential of the display receiver device by a real time streaming protocol (RTSP) M3 message.

21. The display receiver device of claim 13, wherein the secure execution environment is to receive the secure DRM content from the display transmitter device by a Miracast™ peer-to-peer (P2P) channel.

22. The display receiver device of claim 13, wherein the secure DRM content includes music, movie, photo, or video content, and the content is encrypted by a DRM software.

23. A wireless display system, comprising:
a display transmitter device; and
a display receiver device to communicate with the display transmitter device;
wherein the display receiver device is to:
communicate to the display transmitter device, via a wireless display protocol, a digital right management (DRM) scheme supported by the display receiver device having a display, wherein the DRM scheme includes a DRM credential of the display receiver device, and video and audio codec capabilities of the display receiver device;
receive, from the display transmitter device, a decryption and presentation license for the display receiver device based on the DRM credential of the display receiver device, wherein the decryption and presentation license is for decryption and presentation of secure DRM content; and
receive, from the display transmitter device, the secure DRM content, and in turn provisioned to the display; and
wherein the display transmitter device is to:
determine to provide the decryption and presentation license for the display receiver device based on the DRM credential of the display receiver device and the DRM scheme of the display receiver device;
provide, to the display receiver device, the decryption and presentation license for the display receiver device based on a result of the determination; and
pass through the secure DRM content to the display receiver device, wherein the secure DRM content is passed through without transcription by the display transmitter device.

24. The wireless display system of claim 23, wherein the display transmitter device is further to:
acquire, from a license server, the decryption and presentation license for the display receiver device after the display transmitter device has determined to provide the decryption and presentation license for the display receiver device, and before the display transmitter device is to provide the decryption and presentation license to the display receiver device, wherein the decryption and presentation license is determined by the license server based on the DRM credential of the display receiver device.

25. The wireless display system of claim 23, wherein the display transmitter device is further to:
acquire, from a license server, a content download license;
download, from a content server, the secure DRM content;
packetize, the downloaded secure DRM content; and
pass through without transcription the packetized secure DRM content to the display receiver device.

* * * * *